United States Patent

[11] 3,602,905

[72] Inventor Lester Sipkema
New Brighton, Minn.
[21] Appl. No. 829,994
[22] Filed June 3, 1969
[45] Patented Aug. 31, 1971
[73] Assignee Control Data Corporation
Minneapolis, Minn.

[54] SHIELD-TYPE CAPACITIVE MEMORY
8 Claims, 7 Drawing Figs.

[52] U.S. Cl. ........ 340/173 SP
[51] Int. Cl. ........ G11c 17/00
G11c 11/24, G11c 5/02
[50] Field of Search ........ 340/173

[56] References Cited
UNITED STATES PATENTS

| | | | |
|---|---|---|---|
| 3,003,143 | 10/1961 | Beurrier | 340/173 X |
| 3,098,997 | 7/1963 | Means | 340/173 |
| 3,350,691 | 10/1967 | Faulis et al. | 340/173 X |
| 3,397,393 | 8/1968 | Palmateer et al. | 340/173 |

*Primary Examiner*—Stanley M. Urynowicz, Jr.
*Attorney*—Cushman, Darby & Cushman

ABSTRACT: An improved shield-type capacitive memory wherein a matrix is formed by first and second pluralities of conductors arranged in substantially orthogonal relationship so as to define a plurality of bit or information areas with capacitive coupling at first predetermined conductor crossover regions and with little or no capacitive coupling at second predetermined conductor crossover regions and wherein the pluralities of conductors are spaced apart by insulating layers, airgaps at said first predetermined regions and by a shield located between the insulating layers over predetermined regions thereof including said second predetermined regions wherein the improvement provides for the use of conducting members or insulating members placed within the airgaps to markedly increase the capacitive coupling between conductors.

INVENTOR
LESTER SIPKEMA

BY Cushman, Darby & Cushman
ATTORNEYS

INVENTOR
LESTER SIPKEMA

BY Cushman, Darby & Cushman
ATTORNEYS

INVENTOR
LESTER SIPKEMA

BY Cushman, Darby & Cushman
ATTORNEYS

SHIELD-TYPE CAPACITIVE MEMORY

The present invention relates to capacitive memories and more particularly to a shield-type capacitive memory device wherein the capacitive coupling between conductors of the memory matrix is markedly increased to provide improved and more efficient operation.

In the field of shield-type capacitive memories, previous implementations or methods of manufacture have resulted in airgaps between those regions of the conductors of the capacitive matrices where capacitive coupling or enhanced capacitive coupling was intended to exist. Although such devices have served the purpose, they have not proved entirely satisfactory under all conditions of service since the capacitive coupling between conductors of the matrices has often been insufficient or has required the use of excessively high currents or voltages in the memory system in order to provide for satisfactory operation.

Therefore, the general purpose of this invention is to provide a shield-type capacitive memory wherein a matrix is formed by first and second pluralities of conductors arranged in substantially orthogonal relationship so as to define a plurality of conductor crossover regions with capacitive coupling at first predetermined ones of the regions and wherein the regions include means for substantially improving the capacitive coupling between the conductors associated with these predetermined regions to provide for more efficient operation of the memory.

An object of the present invention is the provision of a shield-type capacitive memory having improved capacitive coupling.

Another object is to provide a capacitive memory device with improved efficiency.

Other objects and features of the invention will become apparent to those of ordinary skill in the art as the disclosure is made in the following description of a preferred embodiment of the invention as illustrated in the accompanying sheets of drawings in which.

Figure 1:
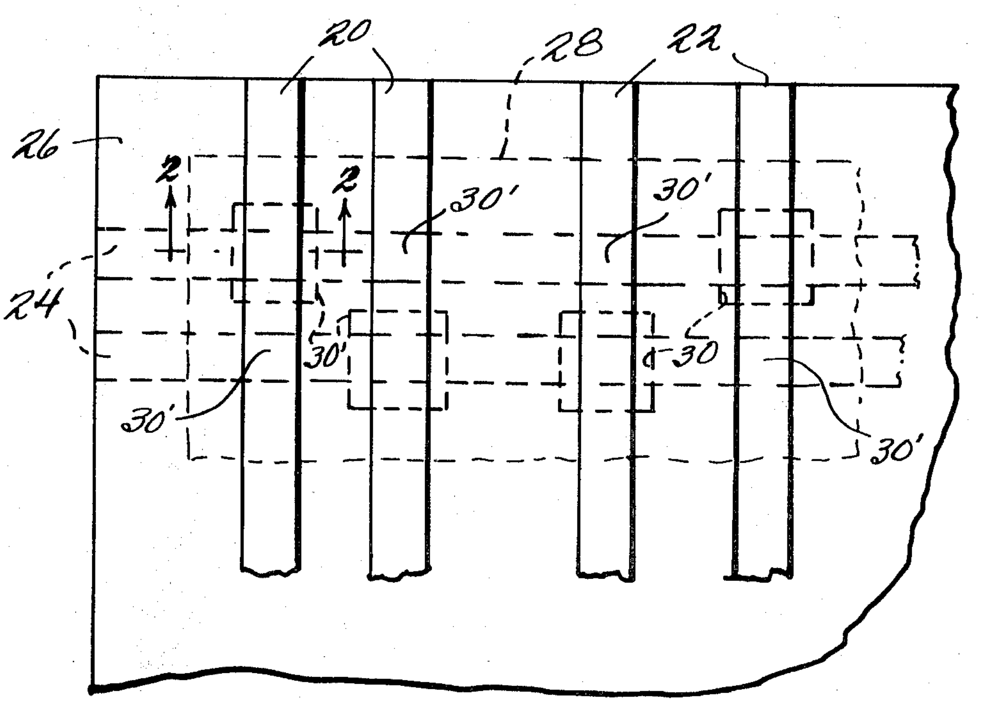
FIG. 1 is a fragmentary plan view of a capacitive memory device in which the improvement of this invention can be used to increase the capacitive coupling at predetermined regions or intersections of the sets of orthogonal conductors.
Figure 2:
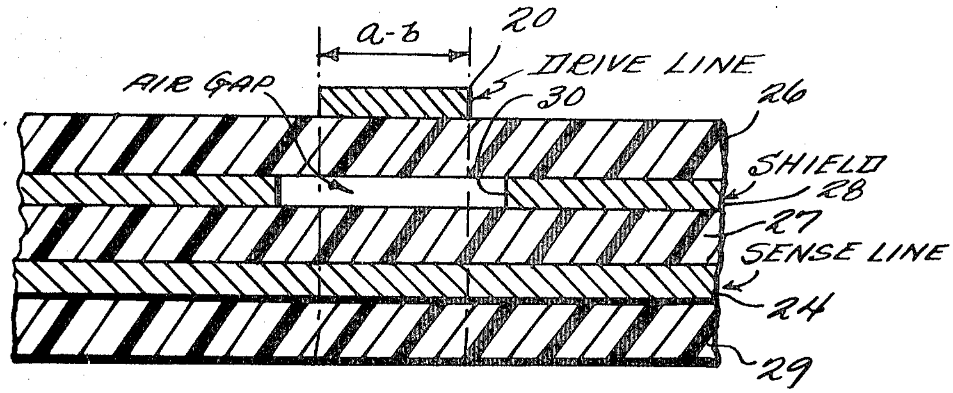
Fig. 2 (PRIOR ART)
FIG. 2 is a section of the device of FIG. 1 taken on the line 2—2 of FIG. 1 looking in the direction of the arrows.

With reference now the drawings wherein like reference characters designate like or corresponding parts throughout the several views, there is shown in FIG. 1 a shield-type capacitive memory device which includes drive lines 20 and 22 and sense lines 24 where the drive lines are located atop an insulating layer 26 of epoxy glass or other suitable insulating material and wherein a shield 28 of conducting material is sandwiched between the insulating layer 26 and a second insulating layer 27, as shown in FIG. 2. The sense line 24 in turn is located on top of a third insulating layer 29. Each of the information areas in the shield 28 contains two selectively positioned apertures 30 which correspond to predetermined conductor crossover regions and allow capacitive coupling between certain crossover regions of the drive and sense lines. Each of the information areas also contain two regions 30' not containing apertures in the crossover regions which allow the shield to act as a ground or a virtual ground and thus prevent capacitive coupling between the drive line and the sense lines in these regions. As a result of this configuration, only two apertures are provided per bit area regardless of whether the bit area stores a logical "one" or a logical "zero" and thus the total capacitive coupling from drive line to sense line is equal for a stored logical "one" or a stored logical "zero." In previous implementations of capacitive shield-type memories, the apertures contained air in the gaps between the insulating layers 26 and 27.

Figure 3:
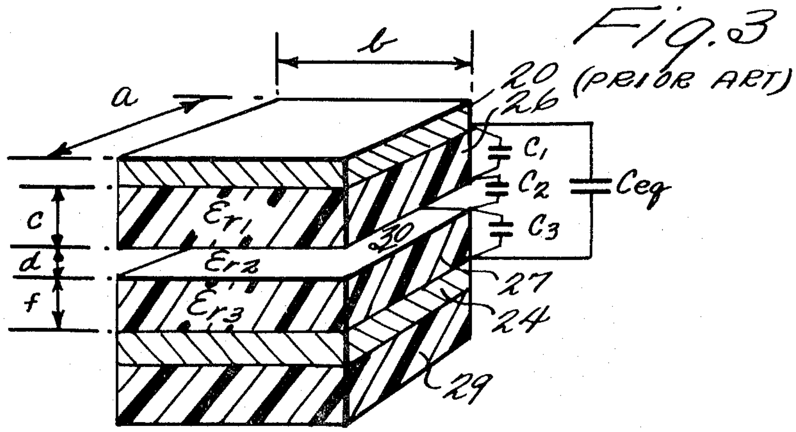
FIG. 3 (PRIOR ART)
FIG. 3 is a perspective view of a section of the device illustrated in FIGS. 1 and 2.

FIG. 3 shows a perspective view of a portion of the prior art memory device as illustrated in FIGS. 1 and 2 to enable the computation of the capacitance between drive line 20 and sense line 24 in a crossover region containing an aperture 30. For example, assuming that the dimensions of the portion of the drive line 20 are $a$ and $b$, the thickness of the insulating layer 26 is $c$, the airgap thickness is $d$ and the thickness of the insulating layer 27 is $f$, then the capacitance $C_{eq}$ between the drive line 20 and the sense line 24 in a crossover region, neglecting fringe effects, is the combined series capacitance of the layers 26 and 27, and the airgap 30, or $C_1$ in series with $C_2$ in series with $C_3$.

Since the capacitance is determined by the general equation $C=A\epsilon/s$ farads it can be seen that the capacitance $C_1=(ab\epsilon_{r1}\epsilon_o/c)$, the capacitance $C_2=(ab\epsilon_{r2}\epsilon_o/d)$ and the capacitance $C_3=(ab\epsilon_{r3}\epsilon_o/f)$ wherein $\epsilon_{r1}$ represents the relative dielectric constant of the layer 26, $\epsilon_{r2}$ represents the relative dielectric constant of the airgap 30, $\epsilon_{r3}$ represents the relative dielectric constant of the insulating layer 27 and $\epsilon_o$ represents the dielectric constant of free space.

Figure 4:
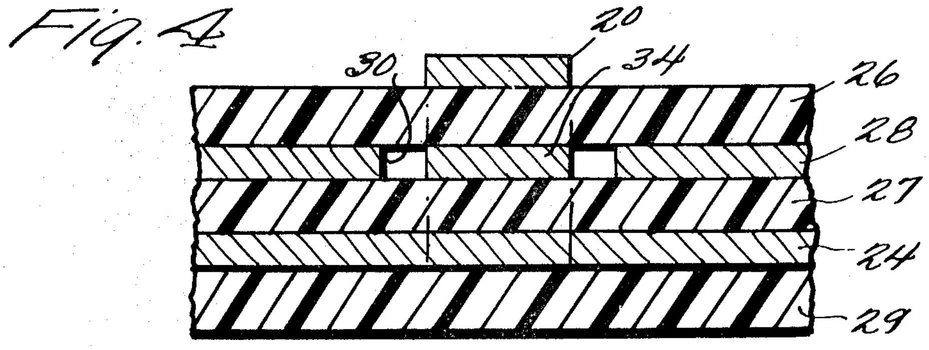
FIG. 4 illustrates a section of the improved device according to this invention corresponding to the section illustrated in FIG. 2.
Figure 5:
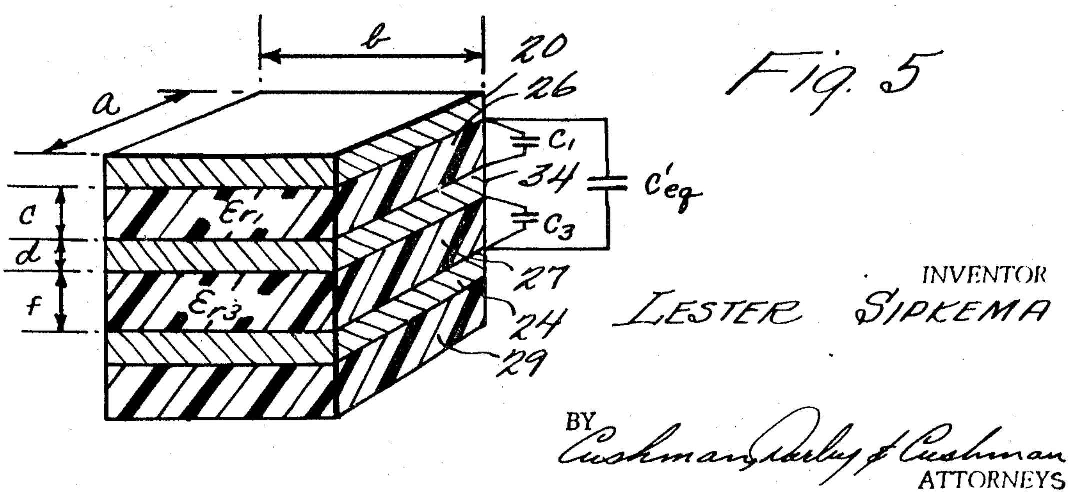
FIG. 5 is a perspective view of a portion of the device illustrated in FIG. 4.

Thus $C_{eq}=C_1$ in series with $C_2$ in series with $C_3$ and $C_{eq}=(ab\epsilon_{r1}\epsilon_{r2}\epsilon_{r3}\epsilon_o/\epsilon_{r1}\epsilon_{rw}f+\epsilon_{r2}\epsilon_{r3}c+\epsilon_{r1}\epsilon_{r3}d)$ With reference now to FIG. 4, one embodiment of the present invention is illustrated wherein the capacitive coupling between the drive line 20 and the sense line 24 is markedly increased by the insertion of a conductive member 34 within the air gap 30. The increased capacitance thus obtained between the drive line 20 and the sense line 24 is best understood by reference to FIG. 5 which illustrates in perspective a portion of the device as illustrated in FIG. 4 and which includes the conductive member 34. Now the capacitance $C'_{eq}$ between the drive line 20 and the sense line 24 in a crossover region and neglecting fringe effects is equal to $C_1$ in series with $c_3$ since the member 34 is conductive.

Since $$C_1=\frac{ab\epsilon_{r1}\epsilon_o}{c} \text{ and } C_3=\frac{ab\epsilon_{r3}\epsilon_o}{f}$$

then $$C'_{eq}=\frac{ab\epsilon_{r1}\epsilon_{r3}\epsilon_o}{\epsilon_{r1}f+\epsilon_{r3}c}$$

Thus, $$\frac{C'_{eq}}{C_{eq}}=\frac{\dfrac{ab\epsilon_{r1}\epsilon_{r3}\epsilon_o}{\epsilon_{r1}f+\epsilon_{r3}c}}{\dfrac{ab\epsilon_{r1}\epsilon_{r2}\epsilon_{r3}\epsilon_o}{\epsilon_{r1}\epsilon_2 f+\epsilon_r\epsilon_{r3}c+\epsilon_{r1}\epsilon_{r3}d}}$$

and $$\frac{C'_{eq}}{C_{eq}}=\frac{\epsilon_{r1}\epsilon_{r2}f+\epsilon_{r2}\epsilon_{r3}c+\epsilon_{r1}\epsilon_{r3}d}{\epsilon_{r2}(\epsilon_{r1}f+\epsilon_{r3}c)} \quad \text{(Equation 1)}$$

A typical example to specifically illustrate the greatly increased coupling capacity achieved by the use of the present invention is as follows: Insulating layers 26 and 27 thicknesses: 0.004 in.

Insulating layers 26 and 27 relative dielectric: $\epsilon_r=4$

Conductive member 34 thickness: 0.002 in.

Drive and sense line width: 0.025 in.

Then if $a=b=(0.025/39.37)$ meters $c=f=(0.004/39.37)$ meters $\epsilon_{r1}=\epsilon_{r3}=4$ $\epsilon_{r2}=1$ $$\frac{C'_{eq}}{C_{eq}}=\frac{4\times 1\times\frac{.004}{39.37}+1\times 4\times\frac{.004}{39.37}+4\times 4\times\frac{.002}{39.37}}{1\left[4\times\frac{.004}{39.37}+4\times\frac{.004}{39.37}\right]}$$

$$\frac{C'_{eq}}{C_{eq}}=2/1$$

Thus, the coupling capacity is doubled in this example.

Figure 6:
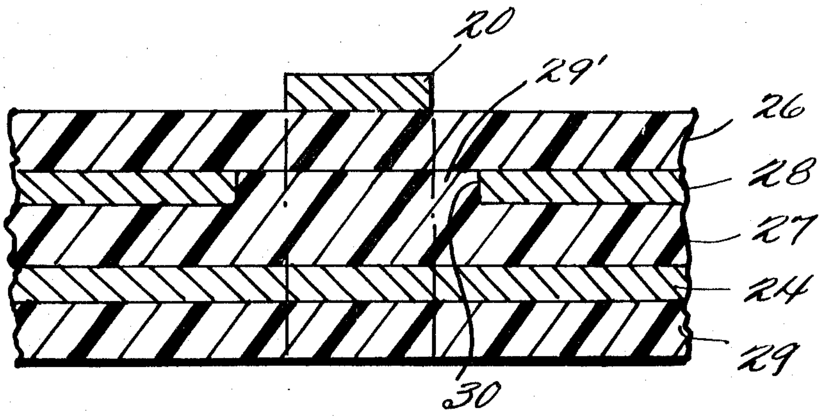
FIG. 6 shows a section of an improved capacitive memory device according to another embodiment of this invention corresponding to the section shown in FIG. 4.

With reference now to FIG. 6 there is shown another embodiment of the present invention for increasing the coupling capacitance between the drive lines 20 and the sense lines 24 wherein the air gap formed by the aperture 30 is filled with an insulating member 29′ which may be integral with either one of the insulating layers 26 or 27 or with both. For the purpose of illustration, the insulating member 29′ is shown to be integral with the insulating layer 27.

Figure 7:
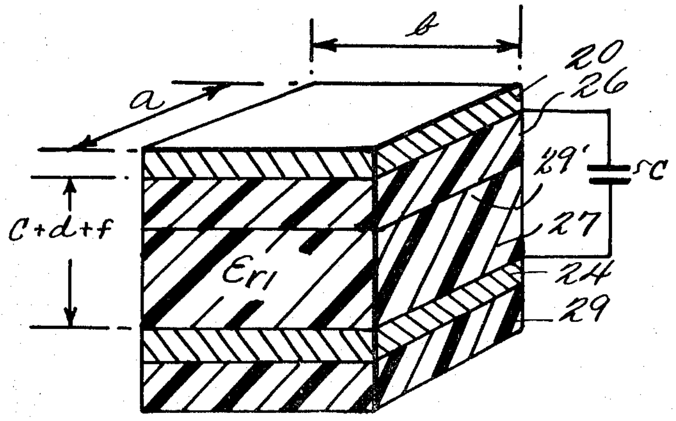
FIG. 7 is a perspective view of a portion of the device shown in FIG. 6.

FIG. 7 is a perspective view of a section of the embodiment illustrated in FIG. 6, and the capacitance between the drive line 20 and sense line 24 is given by the equation $c=(a\, b\epsilon_{r1}\epsilon_o/c+d+f)$.

Thus, the ratio of the capacitance between lines 20 and 24 in the embodiment of FIGS. 6 and 7 as compared to the capacitance between the lines 20 and 24 in the prior art embodiments of FIGS. 1–3 is given by the equation $(C/C_{eq})=(\epsilon_{r1}\epsilon_{r2}f+\epsilon_{r2}\epsilon_{r3}c+\epsilon_{r1}\epsilon_{r3}d/\epsilon_{r2}\epsilon_{r3}(c+d+f))$ (Equation 2).

Using the typical dimensions and dielectric constants previously set forth this equation is as follows:

$$\frac{C}{C_{eq}}=\frac{4\times 1\times\frac{.004}{39.37}+1\times 4\times\frac{.004}{39.37}+4\times 4+\frac{.002}{39.37}}{1\times 4\left[\frac{.004}{39.37}+\frac{.002}{39.37}+\frac{.004}{39.37}\right]}.$$

$$\frac{C}{C_{eq}}=8/5=1.6/1$$

Thus, it can be seen that by using this particular embodiment of the invention the coupling capacity between the drive lines 20 and the sense lines 24 is increased by a factor of 60 percent. Furthermore, if the ratio of $d/c$ or $d/f$ were greater than that used in the illustrative examples above, the increase in coupling capacity between the drive lines 20 and the sense lines 24 will be even greater.

The present invention thus provides for a uniquely improved shield-type capacitive memory wherein the capacitive coupling between the predetermined drive lines and sense lines is markedly increased by the use of conductive members or insulative members in the airgaps customarily present in similar prior art devices. This marked increase in coupling capacitance greatly increases the efficiency of operation of the memory and enables the use of much smaller currents and voltages to accomplish the same results as has been heretofore accomplished only by the use of significantly greater voltages and currents.

It should be understood, of course, that the foregoing disclosure relates to only preferred embodiments of the invention and that numerous modifications or alternations may be made therein without departing from the spirit and the scope of the invention as set forth in the appended claims.

What I claim is:

1. In combination with a shield-type capacitive memory of the type wherein a matrix is formed by first and second pluralities of conductors arranged in substantially orthogonal relationship so as to define a plurality of bit or information areas with capacitive coupling at first predetermined conductor crossover regions and with little or no capacitive coupling at second predetermined conductor crossover regions and wherein said pluralities of conductors are spaced apart by insulating layers, by airgaps at said first predetermined regions and by a conductive shield located between said insulating layers over predetermined portions of said insulating layers including said second predetermined crossover regions, the improvement comprising:

means located within said airgaps in coplanar relationship with respect to said shield for improving the capacitive coupling between the conductors associated with said first predetermined regions.

2. In combination with a shield-type capacitive memory of the type wherein a matrix is formed by first and second pluralities of conductors arranged in substantially orthogonal relationship so as to define a plurality of bit or information areas with capacitive coupling at first predetermined conductor crossover regions and with little or no capacitive coupling at second predetermined conductor crossover regions and wherein said pluralities of conductors are spaced apart by insulating layers, by airgaps at said first predetermined regions and by a shield located between said insulating layers over predetermined portions of said insulating layers including said second predetermined crossover regions, the improvement comprising:

means including conductive members in spaced-apart relationship with respect to said shield and located within said airgaps in coplanar relationship with respect to said shield for improving the capacitive coupling between the conductors associated with said first predetermined regions.

3. The improvement of claim 2 wherein said conductive members are in contiguous relationship with said insulating layers.

4. In combination with a shield-type capacitive memory of the type wherein a matrix is formed by first and second pluralities of conductors arranged in substantially orthogonal relationship so as to define a plurality of bit or information areas with capacitive coupling at first predetermined conductor crossover regions and with little or no capacitive coupling at second predetermined conductor crossover regions and wherein said pluralities of conductors are spaced apart by insulating layers, by airgaps at said first predetermined regions and by a shield located between said insulating layers over predetermined portions of said insulating layers including said second predetermined crossover regions, the improvement comprising:

means including insulating members located within said airgaps in coplanar relationship with respect to said shield for improving the capacitive coupling between the conductors associated with said first predetermined regions.

5. The improvement of claim 4 wherein said insulating members are in contacting relationship with said shield.

6. The improvement of claim 5 wherein said insulating members are in contiguous relationship with said insulating layers.

7. The improvement of claim 6 wherein said insulating layers and said insulating members are of the same material.

8. The improvement of claim 7 wherein said insulating members and at least one of said insulating layers are integral with one another.